US006997073B2

(12) United States Patent
Hattori et al.

(10) Patent No.: US 6,997,073 B2
(45) Date of Patent: Feb. 14, 2006

(54) VEHICLE POWER UNIT

(75) Inventors: Katsutaka Hattori, Saitama (JP); Katsuhito Nakamichi, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 34 days.

(21) Appl. No.: 10/277,805

(22) Filed: Oct. 23, 2002

(65) Prior Publication Data

US 2003/0154811 A1 Aug. 21, 2003

(30) Foreign Application Priority Data

Oct. 26, 2001 (JP) ....................................... 2001-329944

(51) Int. Cl.
*F16H 3/08* (2006.01)
*F16H 57/02* (2006.01)
*F02B 77/00* (2006.01)

(52) U.S. Cl. .................... 74/329; 74/606 R; 123/198 E

(58) Field of Classification Search ............. 123/198 E, 123/197.1, 197.5, 195 C; 477/115, 120, 904; 701/60

See application file for complete search history.

(56) References Cited

U.S. PATENT DOCUMENTS

| | | | | | |
|---|---|---|---|---|---|
| 2,337,330 | A | * | 12/1943 | Julin | 74/29 |
| 4,566,577 | A | * | 1/1986 | Tsuboi | 192/85 CA |
| 4,785,682 | A | * | 11/1988 | Nishimura et al. | 74/359 |
| 4,864,881 | A | * | 9/1989 | Beeson et al. | 74/360 |
| 4,920,825 | A | * | 5/1990 | Okazaki et al. | 74/606 R |
| 5,505,287 | A | * | 4/1996 | Asatsuke et al. | 192/85 R |
| 5,558,059 | A | * | 9/1996 | Yoshinaga et al. | 123/198 E |
| 5,722,291 | A | * | 3/1998 | Fraley et al. | 74/325 |
| 5,943,911 | A | * | 8/1999 | Beckerman | 74/333 |
| 6,491,014 | B1 | * | 12/2002 | Eickert | 123/195 C |
| 6,520,134 | B1 | * | 2/2003 | Plunkett et al. | 123/195 C |
| 6,536,398 | B2 | * | 3/2003 | Neal | 123/195 C |
| 2002/0026840 | A1 | * | 3/2002 | Tokuda et al. | 74/325 |
| 2002/0043237 | A1 | * | 4/2002 | Nomura et al. | 123/197.1 |

FOREIGN PATENT DOCUMENTS

| | | | | | |
|---|---|---|---|---|---|
| DE | 4342185 | A1 | | 6/1995 | |
| EP | 0926399 | A2 | | 6/1999 | |
| EP | 0987413 | A2 | | 3/2000 | |
| GB | 634969 N | A | | 3/1950 | |
| JP | 60-34864 | Y2 | | 10/1985 | |
| JP | 404357349 | A | * | 12/1992 | 74/331 |
| JP | 407063024 | A | * | 3/1995 | |
| WO | WO 87/02110 | A1 | | 4/1987 | |

* cited by examiner

*Primary Examiner*—Roger Pang
(74) *Attorney, Agent, or Firm*—Birch, Stewart, Kolasch & Birch, LLP

(57) ABSTRACT

In a vehicle power unit, a main shaft and a counter shaft of a transmission are placed in and taken out through an opening formed on the crankcase. The main shaft and the counter shaft are rotatably held by a single transmission cover fastened to the crankcase and a cylinder block for covering the opening. In addition, the output shaft is provided with an input gear engaged with an output gear provided on a counter shaft 1 and is rotatably supported on the transmission cover by a bearing holding portion formed on the transmission cover via a ball bearing. The counter shaft and the output shaft are connected via a pair of gears, wherein the necessity of increasing the fastening rigidity with respect to the transmission cover is reduced and the accuracy of the position and the size of the mounting positions of the counter shaft and the output shaft is easily secured with the aforementioned power unit.

19 Claims, 5 Drawing Sheets

VEHICLE POWER UNIT

CROSS-REFERENCES TO RELATED APPLICATIONS

This nonprovisional application claims priority under 35 U.S.C. § 119(a) on Patent Application No. 2001-329944 filed in Japan on Oct. 26, 2001, the entirety of which is herein incorporated by reference.

BACKGROUND OF THE INVENTION

1. Field of the Invention

The present invention relates to a vehicle power unit to be mounted on a vehicle, and more particularly to a vehicle power unit for a motorcycle including an internal combustion engine and a power transmission unit including a transmission and an output shaft.

2. Description of the Background Art

A vehicle power unit of the background art is described in JP-U-60-34864, the entirety of which is hereby incorporated by reference. In this type of power unit for mounting on a motorcycle, a transmission case and a crankcase, both of which are cylindrical, are placed side by side and formed integrally with a frame housing. The frame housing is formed integrally with a cylinder block of the engine. A transmission member, including a main shaft and a counter shaft, is inserted through an opening end of the transmission case, and one of the ends of the transmission member is journaled by a disc-shaped end lid detachably secured on the opening end by a screw. A clutch is mounted on the projected portion of the main shaft projecting from the end lid.

In the aforementioned arrangements of the background art, an output shaft is connected to the counter shaft via an input shaft. The input shaft engages with the output gear provided on the counter shaft in order to transmit a power of the counter shaft to the wheel. The counter shaft and the output shaft separated from each other with a force exerted due to a reaction force of a transmitted power between the input gear and the output gear. A backrush between the output gear and the input gear exceeds a suitable value, which may increase noise caused by engagement and abrasion of the teeth of the output gear and the input gear. Therefore, it is necessary to enhance the connection rigidity of the end lid.

However, when the fastening points are increased by increasing the number of screws for securing the end lid to the transmission case, the number of components increases and the number of assembling steps disadvantageously increase. When the end lid and the transmission case are formed with a fit-in structure (pen cap structure) in addition to being secured with screws and fitted together to increase the fastening rigidity of the end lid, the number of machining processes for forming the fit-in structure and the corresponding costs increase. In addition, since the counter shaft and the output shaft are journaled by different members, it is difficult to ensure accurate mounting positions for both shafts.

SUMMARY OF THE INVENTION

The present invention overcomes the shortcomings associated with the background art and achieves other advantages not realized by the background art.

An object of the present invention is to provide a vehicle power unit in which the counter shaft and the output shaft are connected by a pair of gears, wherein the necessity of increasing the fastening rigidity of the transmission cover may be reduced or eliminated.

An object of the present invention is to provide a vehicle power unit in which the counter shaft and the output shaft are connected by a pair of gears, wherein the accuracy of the positions to which the counter shaft and the output shaft are attached is easily ensured.

An object of the present invention is to provide a vehicle power unit with an increased number of design layouts for the main shaft, counter shaft, and the output shaft to be held by the transmission cover.

An object of the present invention is to provide a vehicle power unit that is reduced in size.

One or more of these and other objects are accomplished by a vehicle power unit comprising a transmission having a single transmission cover; an engine; an opening being formed on a storage member for storing the transmission, wherein power of the engine is transmitted to the transmission; a main shaft and a counter shaft of the transmission that is capable of being taken out and placed in through the opening, the main shaft and the counter shaft being secured on the storage member and rotatably supported by the single transmission cover for covering the opening; and an output shaft being connected to the counter shaft, wherein the output shaft is rotatably held by a holding portion formed on the transmission cover; an output gear being provided on the counter shaft; and an input gear being provided on the output shaft, the output gear operatively engaging the input gear.

One or more of these and other objects are further accomplished by a vehicle power unit comprising a transmission having a single transmission cover; a V-block, multi-cylinder internal combustion engine, wherein power of the engine is transmitted to the transmission; a crankshaft of the engine a storing member for storing the transmission; an opening being formed on the storage member; a main shaft and a counter shaft of the transmission that is capable of being taken out and placed in through the opening, the main shaft and the counter shaft being secured on the storage member and rotatably supported by the single transmission cover for covering the opening; and an output shaft being connected to the counter shaft, wherein the output shaft is rotatably held by a holding portion formed on the transmission cover; an output gear being provided on the counter shaft; and an input gear being provided on the output shaft, the output gear operatively engaging the input gear.

Since the main shaft, the counter shaft, and the output shaft are held by a single transmission cover, a part of the force for separating the counter shaft and the output shaft from each other is caused by a reaction force of the transmitted power between the output gear and the input gear and is received by the transmission cover itself. In addition, the distance between the counter shaft and the output shaft can be accurately determined.

Since the counter shaft and the output shaft connected via the output gear and the input gear are rotatably held by the holding portion formed on the single transmission cover secured on the storage member to cover the opening, a part of the force to separate the counter shaft and the output shaft from each other is caused by the reaction force of the transmitted power between the output gear and the input gear and is received by the transmission cover itself. In addition, an increase in the number of the required fasteners is reduced or eliminated and an increase in the number of components is prevented. Since it is not necessary to employ a fit-in structure, increase in the costs is prevented.

The transmission cover may also have a contour corresponding to the layout of the main shaft, the counter shaft, and the output shaft. The size of the transmission cover may be minimized while securing a minimum size that can hold these shafts and secure a required rigidity. The size of the transmission cover may be minimized while securing a minimum size that can hold the main shaft, the counter shaft, and the output shaft, whereby the transmission cover and the power unit can be reduced in size.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinafter and the accompanying drawings which are given by way of illustration only, and thus are not limitative of the present invention, and wherein:

FIG. 4 is a cross sectional view taken along the line IV—IV in FIG. 1; and.

DETAILED DESCRIPTION OF THE PREFERRED EMBODIMENTS

Figure 1:
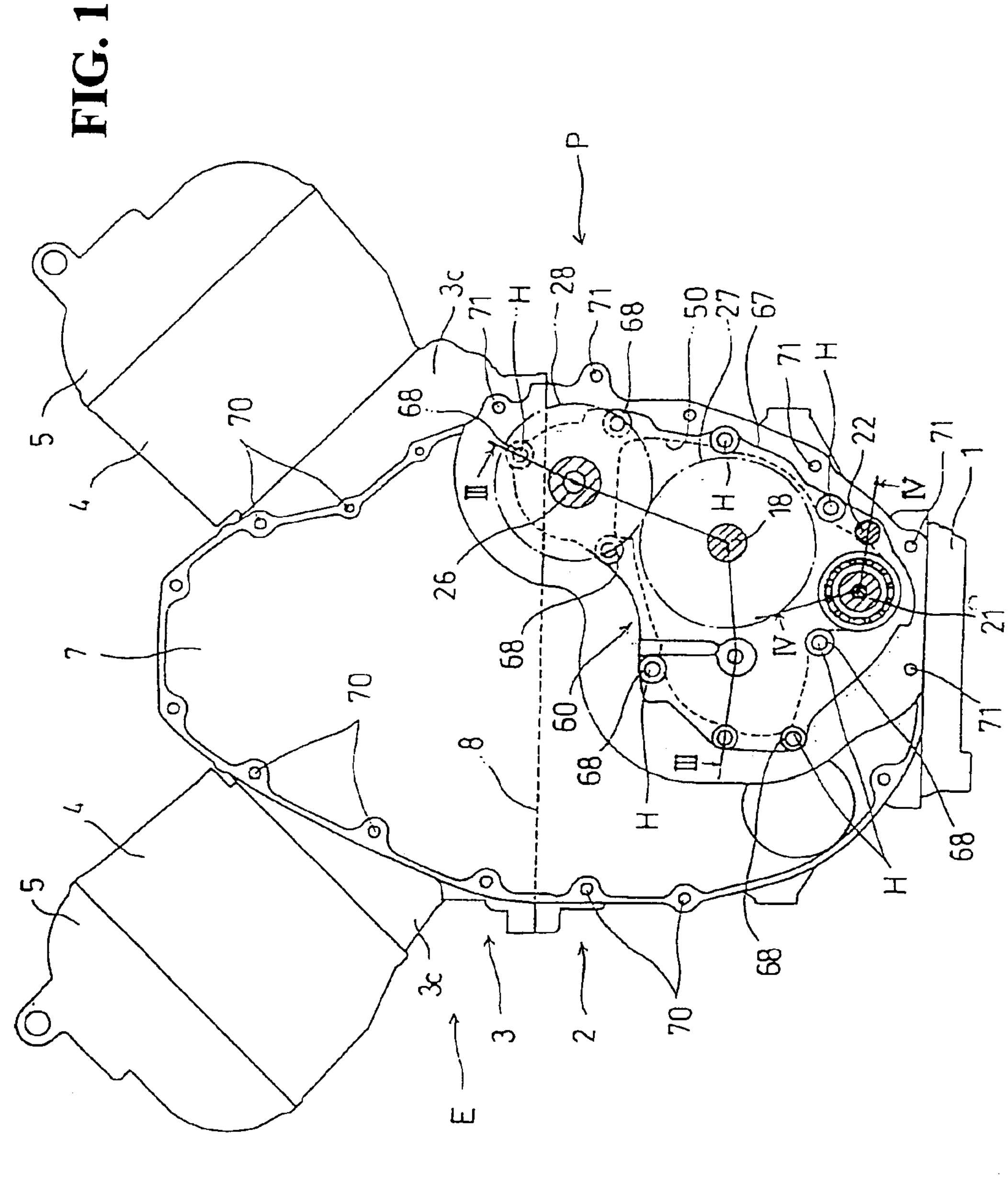
FIG. 1 is a rear view of a vehicle power unit having a transmission cover with a portion of a rear cover removed according to an embodiment of the present invention.
Figure 2:
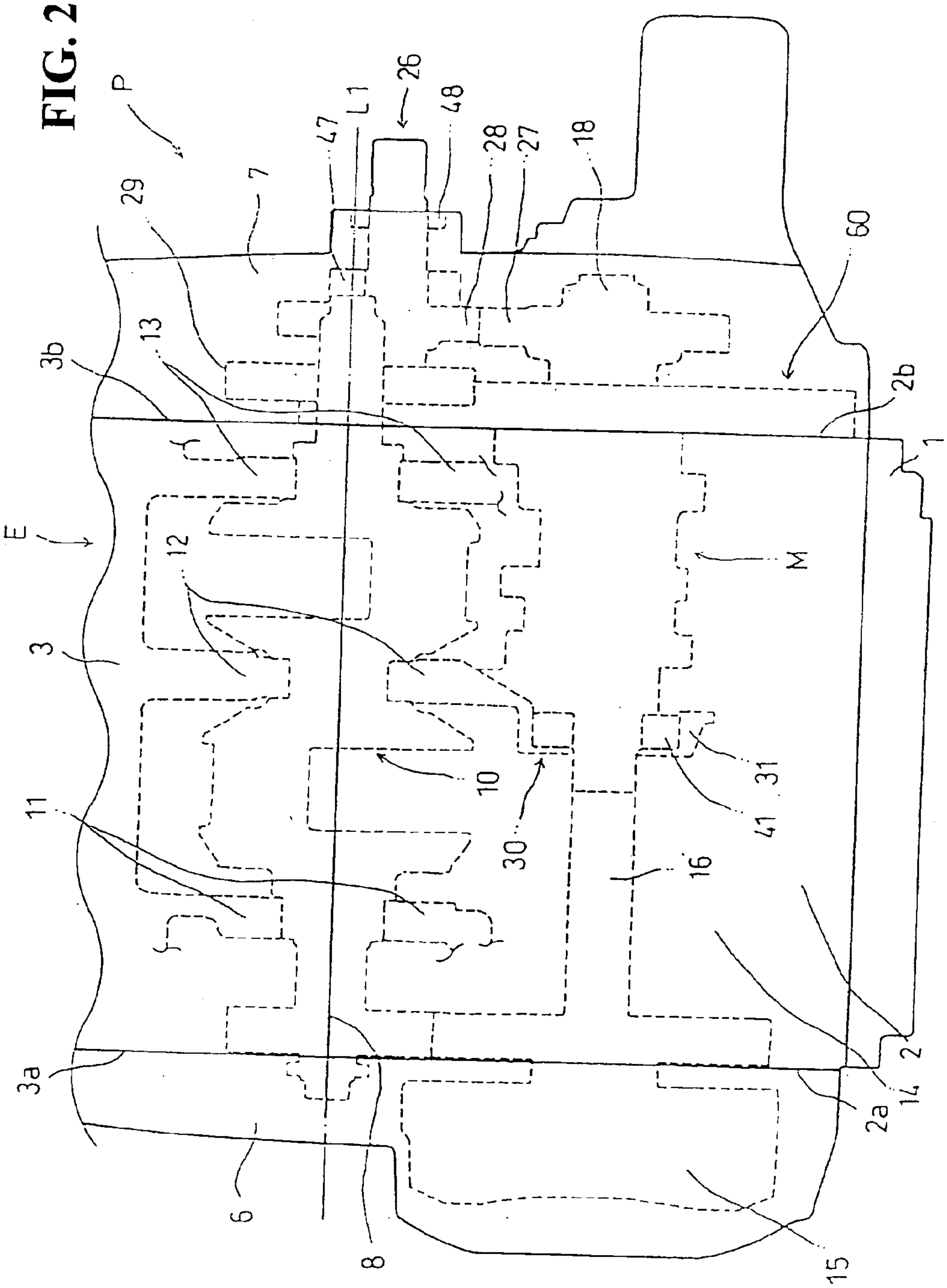
FIG. 2 is a partial, sectional view of a left side of an internal construction of a crank chamber of the power unit in FIG. 1.
Figure 3:
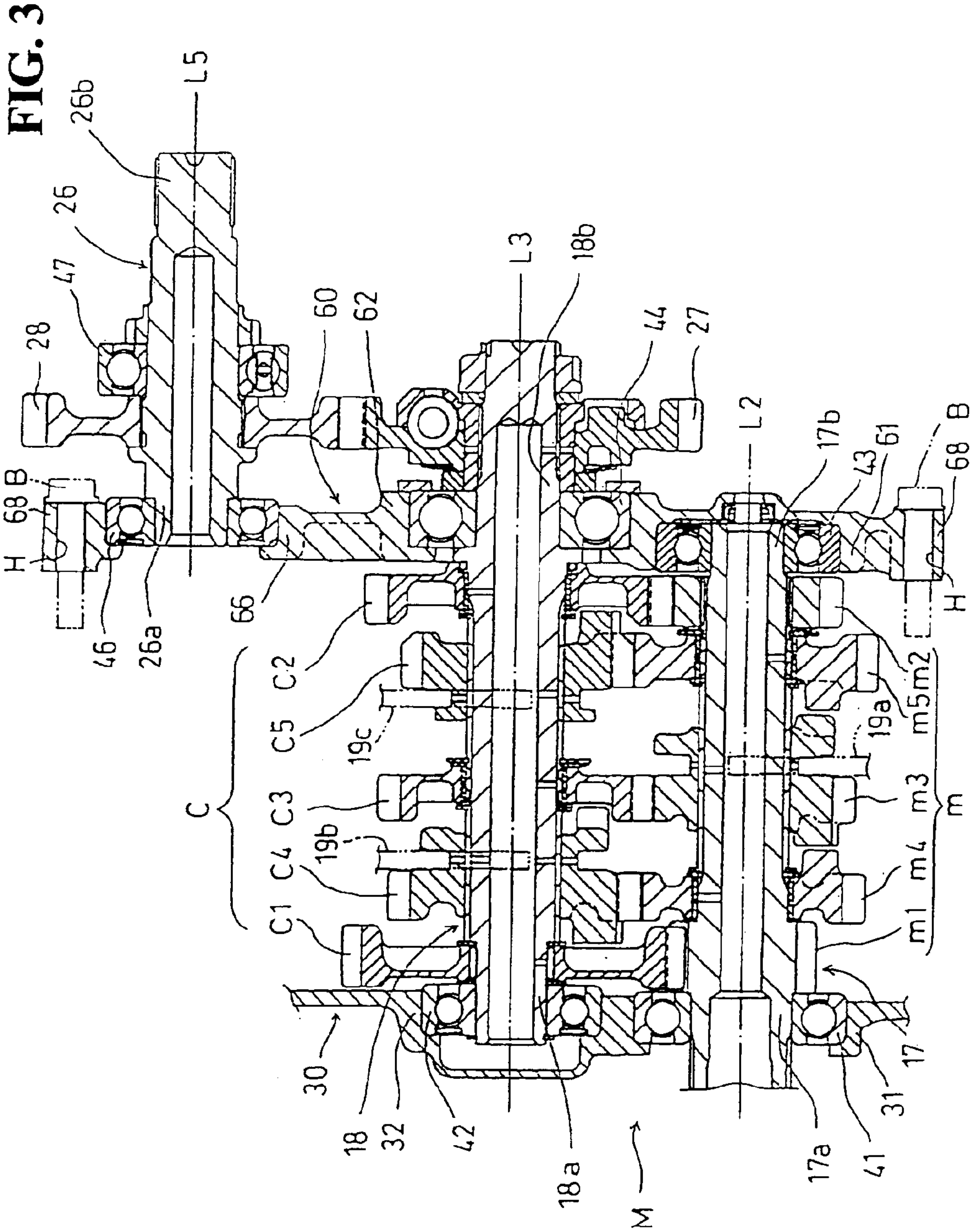
FIG. 3 is a cross sectional view taken along the line III—III in FIG. 1.
Figure 4:
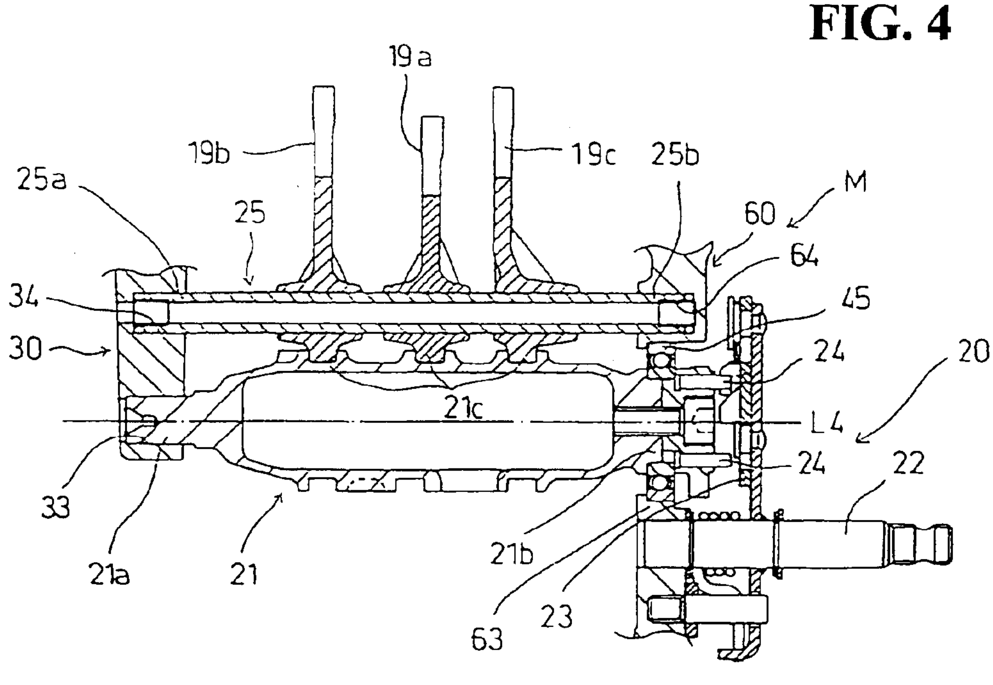
Figure 5:
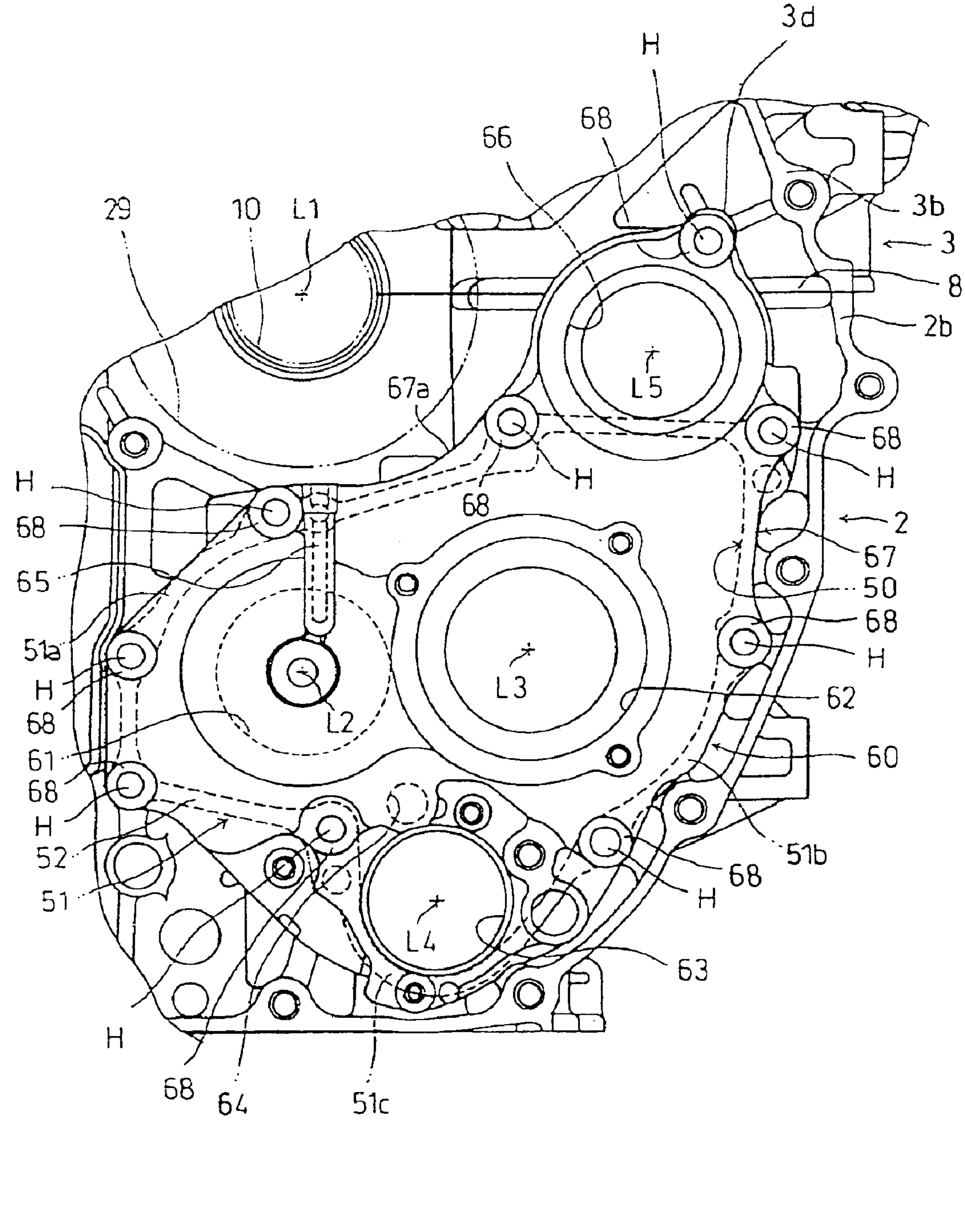
FIG. 5 is a rear of an opening and the transmission cover.

The present invention will hereinafter be described with reference to the accompanying drawings. FIG. 1 is a rear view of a vehicle power unit having a transmission cover with a portion of a rear cover removed according to an embodiment of the present invention. FIG. 2 is a partial, sectional view of a left side of an internal construction of a crank chamber of the power unit in FIG. 1. FIG. 3 is a cross sectional view taken along the line III—III in FIG. 1. FIG. 4 is a cross sectional view taken along the line IV—IV in FIG. 1. FIG. 5 is a rear of an opening and the transmission cover.

Referring now to FIG. 1 and FIG. 2, the vehicle power unit P to which the present invention is applied in a preferred embodiment includes a V-type, four cylinder internal combustion engine E mounted on a motorcycle in a vertical arrangement so that the axis of rotation L1 of the crankshaft 10 is oriented in the fore-and-aft direction of the vehicle body. A power transmission portion, including a constant-mesh transmission M and an output shaft 26 are also provided.

The internal combustion engine E includes a crankcase 2 to which an oil pan 1 is connected on a lower end surface thereof, a cylinder block 3 connected on an upper end surface of the crank case 2 and including a pair of left and right cylinder banks formed in a V-shape with four cylinders 3*c* arranged alternately on both sides in a direction of the axis of rotation L1. A pair of left and right cylinder heads 4 is connected, respectively, to the left and the right cylinder banks, and a pair of left and right head covers 5 is connected, respectively, to both of the cylinder heads 4. The crankcase 2 and the cylinder block 3 form an engine body. The front end surfaces 2*a*, 3*a* and the rear end surfaces 2*b*, 3*b* of the crankcase 2 and the cylinder block 3 are covered by the front cover 6 and the rear cover 7 and connected to the end surfaces 2*a*, 3*a*; 2*b*, 3*b*.

One of skill in the art will appreciate that in this embodiment, "front and rear", "up and down", and "left and right" indicate directions relative to the vehicle body. In addition, one of skill in the art will appreciate that the term "axial direction," as used hereinafter, refers to the direction of the axis of rotation of the counter shaft of the transmission.

The crankshaft 10, having an axis of rotation L1 residing on the same plane as the connecting surface 8 between the crankcase 2 and the cylinder block 3, is formed integrally with the crankcase 2 and the cylinder block 3. The crankcase 10 is rotatably supported between the crankcase 2 and the cylinder block 3 by three main bearings, including slip bearings held respectively by a front bearing holding portion 11, an intermediate bearing holding portion 12, and a rear bearing holding portion 13 constructed by the combination of the crankcase 2 and the cylinder block 3. The crankshaft 10 disposed in the crank chamber 14 formed by the crankcase 2 and the lower portion of the cylinder block 3 is rotatably driven by a piston slidably fitted in each of the cylinders 3*c* and operating with a reciprocating motion via a connecting rod.

Referring to FIG. 3 and FIG. 4, the transmission M to which a power of the crankshaft 10 is transmitted via a multi-plate friction speed change clutch 15 includes a main shaft 17 spline-connected to the output shaft 16 of the speed change clutch 15 and mounted with a speed change gear group m on the main side, a counter shaft 18 to be mounted with the speed change gear group c on the counter side and an output gear 27 engaged respectively with the speed change gear group m on the main side, and a speed change operation mechanism 20 having three shift forks 19*a*, 19*b*, and 19*c* operated by the speed change lever (not shown).

The speed change gear group m on the main side is constructed of first to fifth gears m1–m5, and the speed change gear group c on the counter side is constructed of first to fifth gears c1–c5 constantly engaged with the speed change gears m1–m5 respectively corresponding to the first to fifth gears m1–m5. The third gear m3 rotating integrally with the main shaft 17, moves on the main shaft 17 in the axial direction by the shift fork 19*a*, selectively engages with the fourth gear m4 and the fifth gear m5, and rotates integrally with the engaged gears m4, m5. Similarly, the fourth gear c4 rotating integrally with the counter shift 18, moves on the counter shaft 18 in the axial direction by the shift fork 19*b*, selectively engages with the first gear c1 and the third gear c3, and rotates integrally with the engaged gears c1, c3. Further, the fifth gear c5 rotating integrally with the counter shaft 18, rotates integrally with the second gear c2 when it is moved on the counter shaft 18 in the axial direction by the shift fork 19*c* and engages with the second gear c2.

Referring to FIG. 4, the speed change operation mechanism 20 includes the speed change lever, a shift drum 21, and an interlocking mechanism. The interlocking mechanism is constructed of a shift spindle 22 rotated by the operation of the aforementioned speed change lever, a shift arm 23 interlocked with the rotation of the shift spindle 22, a shift pin 24 formed integrally with the shift drum 21 and engaged with the shift arm 23 and the like. Accordingly, the operation of the aforementioned speed change lever is transmitted to the shift drum 21. The shift arm 23 rotates the shift drum 21 via the shift pin 24 by the operation of the aforementioned speed change lever. Therefore, the three shift forks 19*a*, 19*b*, 19*c* fitted into the cam groove 21*c* move on the supporting shaft 25 in the axial direction, and the speed is changed by the third gear m3, the fourth gear c4, and the fifth gear c5 functioning also as a shifter moved by these shift forks 19*a*, 19*b*, and 19*c*.

Power of the counter shaft 18 that corresponds to power of the crankshaft 10 after the speed has changed by the transmission M is transmitted to the rear wheel via a final drive system. The final drive system includes an output shaft 26 connected to the counter shaft 18. As shown in FIG. 3, the output gear 27 is spline-connected to the rear end portion 18*b* of the counter shaft 18, and the input gear 28 engaged with the output gear 27 is spline-connected to the output shaft 26. The power of the counter shaft 18 is transmitted to the output shaft 26 via the output gear 27 and the input gear 28. A power of the output shaft 26 is transmitted to the rear wheel via the drive shaft (not shown) and is connected to the rear end portion 26*b* of the output shaft 26 and a deceleration mechanism to rotate the rear wheel.

As shown in FIG. 3 and FIG. 4, the main shaft 17, the counter shaft 18, the shift drum 21, the supporting shaft 25, and the output shaft 26 are disposed in parallel with respect to each other so as to extend in the fore-and-aft direction, and the respective axes of rotation L2, L3, L4, L5 of the main shaft 17, the counter shaft 18, the shift drum 21, and the output shaft 26 are laid in parallel with the axis of rotation L1 of the crankshaft 10. The front end portion 17*a* of the main shaft 17 (See FIG. 5) and the front end portion 18*a* of the counter shaft 18 positioned right below the rear portion of the crankshaft 10 are rotatably held by ball bearings 41, 42. The ball bearings 41, 42 are held respectively by bearing holding portions 31, 32 formed on the bearing holding body 30 formed integrally with the intermediate bearing holding portion 12 at a position below the portion of the intermediate bearing holding portion 12 on a side of the crankcase 2. The front end portion 21*a* of the shift drum 21 is inserted into the shaft hole 33 of the bearing holding body 30 and rotatably held therein, and the front end portion 25*a* of the supporting shaft 25 is inserted into the shaft hole 34 of the bearing holding body 30 and held therein.

Referring to FIG. 5, the rear end portions 17*b*, 18*b*, 21*b*, 25*b* of the main shaft 17, the counter shaft 18, the shift drum 21, and the supporting shaft 25 cover the opening 50 formed on the rear wall of the crankcase 2, and are held by the transmission cover 60 that is to be fastened by bolts B (See FIG. 3). This plurality of fasteners, for example nine fasteners, is provided across the rear wall of the crankcase 2 and the rear wall of the cylinder block 3.

The main shaft 17, the counter shaft 18, and the shift drum 21 are rotatably held by the transmission cover 60 via the ball bearings 43, 44, 45 held by the bearing holding portions 61, 62, 63 formed integrally with the transmission cover 60, respectively. The supporting shaft 25 is inserted into the bottomed shaft hole 64 of the transmission cover 60 and held therein. Accordingly, the speed change gear group m on the main side and the speed change gear group c of the counter side are disposed in the crank chamber 14, and the output gear 27 is disposed in a space defined between the transmission cover 60 and the rear cover 7 for covering the entire transmission cover 60. Therefore, the crankcase 2 and the cylinder block 3 form a storage member also serving as a transmission case, e.g., a transmission M is stored within the transmission case. An oil passage 65 is formed in the transmission cover 60 so as to communicate with the oil passage formed in the crankcase 2 for supplying lubricant to the ball bearing 43.

The output shaft 26 is rotatably held at a front end portion 26*a* thereof by the transmission cover 60 via the ball bearing 46 held by the bearing holding portion 66 formed integrally with the transmission cover 60. The output shaft 26 is rotatably held by the ball bearing 47 held by the bearing holding portion of the rear cover 7 at the position closer to the rear cover 7 with respect to the input gear 28. The rear end portion 26*b* of the output shaft 26 connected to the aforementioned drive shaft passes through the rear cover 7 and is projected rearward as shown in FIG. 1. An oil seal 48 for sealing between the output shaft 26 of the rear cover 7 and the rear cover 7 is also provided in the preferred embodiment.

As seen in FIG. 5, the surface 52 of a peripheral edge portion 51 defining the opening 50 facing toward the transmission cover 60 in the axial direction resides on the same plane with the rear end surface 2*b* of the crankcase 2 to which the rear cover 7 is connected. The surface 52 is formed with a plurality of screw holes, e.g., eight screw holes at regular intervals along the peripheral edge portion 51. The peripheral edge portion 51 has arcuate portions 51*a*, 51*b* which are slightly larger than the diameters of the largest speed change gears, respectively out of the speed change gear group m on the main side and the speed change gear group c on the counter side. The peripheral edge portion 51 also has an arcuate portion 51*c* that is slightly larger than the largest diameter of the shift drum 21, so that the opening 50 ensures a minimum diameter.

The transmission cover 60 has a peripheral edge portion 67 having a non-circular contour when viewed in the axial direction corresponding to the configuration of the aforementioned peripheral edge portion 51. The peripheral edge portion 67 is formed with eight boss portions 68 having insertion holes H for inserting the bolts B corresponding to the aforementioned screw holes on the peripheral edge portion 51, and a boss portion 68 having an insertion hole H for inserting the bolt B corresponding to an screw hole of the boss portion 3*d* formed on the rear wall of the cylinder block 3. In addition, the peripheral portion 67 includes a recess 67*a* curved substantially along the rotating surface of the drive gear 29 in order to prevent interference with the drive gear 29 (See FIG. 1 as well). The drive gear 29 for driving auxiliary machineries is a member mounted on the crankshaft 10.

The respective boss portions 68 abut against the opposite surface 52 or the boss portion 3*d* with the transmission cover 60 connected to the crankcase 2 and the cylinder block 3. The transmission cover 60 and the aforementioned engine body are only connected by bolts B in a preferred embodiment. The main shaft 17 attached with the speed change gear group m on the main side and the ball bearing 41; the counter shaft 18 attached with the speed change gear group c on the counter side and the ball bearing 42; the output gear 27; and a shift drum 21 fitted with the shift forks 19*a*, 19*b*, 19*c* supported by the supporting shaft 25 are assembled in advance to the transmission cover 60, via the ball bearings 43, 44, 45, respectively. The supporting shaft 25, the shift spindle 22, and the, aforementioned interlocking mechanism are assembled in advance on the transmission cover 60 to form a unitary component.

The portion of the main shaft 17 and the counter shaft 18 of the unitary component is inserted into the crank chamber 14 through the opening 50, and the main shaft 17 is spline-connected to the output shaft 16 of the speed change clutch 15. The ball bearing 41 of the main shaft 17 and the ball bearing 42 of the counter shaft 18 are then inserted into the corresponding bearing holding portions 31, 32. The front end portion 21*a* of the shift drum 21 is inserted into the corresponding shaft hole 33, and the front end portion 25*a* of the supporting shaft 25 is inserted into the shaft hole 34. The transmission cover 60 is subsequently fastened to the crankcase 2 and the cylinder block 3 by bolts B, and is assembled on the aforementioned engine body. Accordingly, the main shaft 17 and the counter shaft 18 can be removed or inserted through the opening 50 with the crankcase 2 and the cylinder block 3 connected.

After the transmission cover 60 is assembled, the rear cover 7 on which the output shaft 26 is attached in advance with the input gear 28 and the both ball bearings 47, is joined to the rear end surfaces 2*b*, 3*b* by covering the entire transmission cover 60 so that the input gear 28 engages with the output gear 27. The front end portion 26*a* of the output shaft 26 is fitted in advance into the ball bearing 46 built into the bearing holding portion 66 of the transmission cover 60. The rear cover 7 is inserted into the insertion hole 70 of the rear cover 7 and is connected to the crankcase 2 and the cylinder block 3 by bolts screwed into the screw hole 71 on the crankcase 2 and the cylinder block 3.

The operation and the effects of the aforementioned embodiment will be described hereinafter. The counter shaft 18 and the output shaft 26 connected via the output gear 27 and the input gear 28 are fastened on the engine body. The counter shaft 18 and the output shaft 26 are rotatably held by the bearing holding portion 66 formed on a single transmission cover 60 for covering the opening 50 formed on the crankcase 2 via the ball bearing 46. A portion of the force for separating the counter shaft 18 and the output shaft 26 from each other is generated by a reaction force from the transmitted power between the output gear 27 and the input gear 28 and is received by the transmission cover 60. Accordingly, it is not necessary to the fastening rigidity of the transmission cover 60 with respect to the aforementioned engine body, and the number of bolts B and component parts may be reduced.

Since the boss portion 68 of the transmission cover 60 abuts against the peripheral edge portion 51 of the opening 50 and the boss portion 3*d* of the cylinder block 3 in the axial direction, it is not necessary to employ a fit-in structure, and the costs of the power unit P do not increase. Since the counter shaft 18 and the output shaft 26 are held by a single transmission cover 60, the distance between both shafts 18, 26 can be determined with a high degree of accuracy.

Since the contour of the peripheral edge portion 67 of the transmission cover 60 is not circular when viewed in the axial direction, the transmission cover 60 may have a contour corresponding to the layout of the main shaft 17, the counter shaft 18, the shift drum 21, and the output shaft 26. Therefore, the size of the transmission cover 60 may be minimized while simultaneously securing the minimum size including the space for arranging the bearing holding portions 61–63, 66, for rotatably holding the main shaft 17, the counter shaft 18, the shift drum 21, and the output shaft 26, the shift spindle 22, the aforementioned interlocking mechanism, etc. while also securing required the rigidity. The transmission cover 60 can be downsized, and the power unit P can be downsized.

Since a recess 67*a* for preventing interference with the drive gear 29 for driving auxiliary machineries that correspond to a member to be mounted on the crankshaft 10 is formed on the recess portion 67*a*, the transmission cover 60 and the drive unit P can be downsized without constraining the layout of the drive gear 29 that corresponds to a peripheral member of the transmission cover 60. The transmission cover 60 is integrated into the aforementioned unitary component with the counter shaft 18, the main shaft 17 and the output gear 27 mounted thereon, and the shift drum 21, and the main shaft 17 is spline-connected with the output shaft 16 of the speed change clutch 15. Accordingly, the transmission M can be assembled and disassembled with respect to the aforementioned engine body without removing the speed change clutch 15. Therefore, assembly and disassembly of the transmission M with respect to the engine body is made easier. Specifically, the transmission of the present invention is improved with respect to the background art in which the clutch mounted on the projected shaft portion projecting from the end lid has to be disassembled in order to disassemble the end lid and then disassemble the transmission from the frame housing.

In the present invention, the number of steps required for assembling and disassembling the transmission M is reduced, and the ease of assembly and maintenance of the power unit P is improved. Since the output shaft 26 can easily be disassembled from the transmission cover 60 by performing only the step of removing the rear cover 7, the number of steps for disassembling the output shaft 26 and the transmission M in the case of maintenance or the like is further reduced, and the ease of maintenance or the like is improved.

Another embodiment in which a part of the construction of the aforementioned embodiment is modified will be described hereinafter with respect to those portions only pertaining to the modified construction. Although the transmission cover 60 is fastened across the crankcase 2 and the cylinder block 3 in the aforementioned embodiment, it may be fastened only on the crankcase 2. In addition, although the counter shaft 18 and the output shaft 26 are oriented in parallel with each other in the aforementioned embodiment, the counter shaft 18 and the output shaft 26 may be disposed so as to intersect with each other, e.g., including a case in which these parts intersect at right angles.

Although the engine employed in the aforementioned embodiment is a V-type, four cylinder, internal combustion engine, the internal combustion engine may have any number of cylinders and any type of cylinder arrangements. In addition, it may be a motor other than an internal combustion engine. Although the insertion hole H is provided at a position which coincides with the input gear 28 in the axial direction in the aforementioned embodiment as shown in FIG. 1, it is also possible to provide all the insertion holes H and the corresponding screw holes at positions that do not coincide with the input gear 28 in the axial direction. In this case, the output shaft 26 can be integrated in advance with the input gear 28 engaged with the output gear 27 and the ball bearing 47 mounted thereon into the aforementioned unit component. Accordingly, the main shaft 17, the counter shaft 18, the shift drum 21, and the output shaft 26 are integrated with the transmission cover 60, and the ease of assembly and disassembly of the transmission M and the output shaft 26 with respect to the aforementioned engine body is further improved.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A vehicle power unit comprising:

a transmission having a single removable transmission cover having a peripheral edge portion and a bearing holding portion integrally formed within said transmission cover to support bearings secured within said bearing holding portion;

an engine having a crankcase;

an opening being formed on a wall of the crankcase, said wall of the crankcase partially forming a storage member for storing the transmission, wherein power of the engine is transmitted to the transmission and said opening includes a peripheral edge portion formed along a periphery of said opening and axially aligned and operatively engaged with the peripheral edge portion of said transmission cover, said single removable transmission cover covering the opening formed on the wall of the crankcase;

a main shaft and a counter shaft of said transmission that is capable of being taken out and placed in through the opening, said main shaft and said counter shaft being secured on said storage member and rotatably supported by the single transmission cover for covering said opening;

a final drive output shaft being connected to said counter shaft, wherein said final drive output shaft, said main shaft and said counter shaft are rotatably held by said bearings within the bearing holding portion formed on said transmission cover;

an output gear being provided on said counter shaft;

an input gear being provided on said final drive output shaft, said output gear operatively engaging said input gear, wherein said counter shaft, said main shaft and said output gear are integrally mounted on said transmission cover; and a multi-plate friction speed change clutch, wherein said clutch includes a clutch output shaft and said main shaft is spline-connected to the clutch output shaft.

2. The vehicle power unit according to claim 1, wherein a contour of said transmission cover is not circular when viewed with respect to an axial direction of said transmission cover.

3. The vehicle power unit according to claim 1, wherein said clutch is mounted with a speed change gear group on a main side, and the counter shaft is mounted with a speed change gear group on a counter side and the main shaft is engaged respectively with the speed change gear group on the main side, and a speed change operation mechanism.

4. The vehicle power unit according to claim 3, said speed change operation mechanism further comprising:

a shift drum;

an interlocking mechanism; and a plurality of shift forks operated by the speed change operation mechanism.

5. The vehicle power unit according to claim 4, said interlocking mechanism further comprising:

a shift spindle being rotated by an operation of the speed change operation mechanism;

a shift arm being interlocked with the rotation of the shift spindle; and a shift pin being formed integrally with the shift drum and engaged with the shift arm.

6. The vehicle power unit according to claim 1, wherein the power of the counter shaft that corresponds to power of a crankshaft is transmitted by a final drive system, said final drive system including said final drive output shaft connected to the counter shaft.

7. The vehicle power unit according to claim 2, wherein the output gear is spline-connected to a rear end portion of the counter shaft, and the input gear is engaged with the output gear and is spline-connected to the final drive output shaft.

8. The vehicle power unit according to claim 7, wherein the main shaft, the counter shaft, and the final drive output shaft are disposed in parallel with respect to each other so as to extend in a direction parallel with a direction of rotation of the crankshaft.

9. The vehicle power unit according to claim 4, wherein the main shaft, the counter shaft, the shift drum and the final drive output shaft are disposed in parallel with respect to each other so as to extend in a direction parallel with a direction of rotation of the crankshaft.

10. A vehicle power unit comprising:

a transmission having a single removable transmission cover having a peripheral edge portion and a bearing holding portion integrally formed within said transmission cover to support bearings secured within said bearing holding portion;

a V-block, multi-cylinder internal combustion engine, wherein power of the engine is transmitted to the transmission, said engine having a crankcase;

a crankshaft of said engine;

a storing member for storing the transmission;

an opening being formed on a wall of the crankcase, said wall of the crankcase partially forming the storage member, wherein said opening includes a peripheral edge portion formed along a periphery of said opening and axially aligned and operatively engaged with the peripheral edge portion of said transmission cover, said single removable transmission cover covering the opening formed on the wall of the crankcase;

a main shaft and a counter shaft of said transmission that is capable of being taken out and placed in through the opening, said main shaft and said counter shaft being secured on said storage member and rotatably supported by the single transmission cover for covering said opening;

a final drive output shaft being connected to said counter shaft, wherein said final drive output shaft, said main shaft and said counter shaft are rotatably held by said bearings within the bearing holding portion formed on said transmission cover;

an output gear being provided on said counter shaft; and an input gear being provided on said final drive output shaft, said output gear operatively engaging said input gear, wherein said counter shaft, said main shaft and said output gear are integrally mounted on said transmission cover; and a multi-plate friction speed change clutch, wherein said clutch includes a clutch output shaft and said main shaft is spline-connected to the clutch output shaft.

11. The vehicle power unit according to claim 10, wherein said clutch is mounted with a speed change gear group on a main side, and the counter shaft is mounted with a speed change gear group on a counter side and the main shaft is engaged respectively with the speed change gear group on the main side, and a speed change operation mechanism.

12. The vehicle power unit according to claim 11, said speed change operation mechanism further comprising:

a shift drum;

an interlocking mechanism; and a plurality of shift forks operated by the speed change operation mechanism.

13. The vehicle power unit according to claim 12, said interlocking mechanism further comprising:

a shift spindle being rotated by an operation of the speed change operation mechanism;

a shift arm being interlocked with the rotation of the shift spindle; and a shift pin being formed integrally with the shift drum and engaged with the shift arm.

14. The vehicle power unit according to claim 10, wherein a contour of said transmission cover is not circular when viewed with respect to an axial direction of said transmission cover.

15. The vehicle power unit according to claim 10, wherein the power of the counter shaft that corresponds to power of the crankshaft is transmitted by a final drive system, said final drive system including said final drive output shaft connected to the counter shaft.

16. The vehicle power unit according to claim 10, wherein the output gear is spline-connected to a rear end portion of the counter shaft, and the input gear is engaged with the output gear and is spline-connected to the final drive output shaft.

17. The vehicle power unit according to claim 16, wherein the main shaft, the counter shaft, and the final drive output shaft are disposed in parallel with respect to each other so as to extend in a direction parallel with a direction of rotation of the crankshaft.

18. The vehicle power unit according to claim 12, wherein the main shaft, the counter shaft, the shift drum and the final drive output shaft are disposed in parallel with respect to each other so as to extend in a direction parallel with a direction of rotation of the crankshaft, and the main shaft, the counter shaft, and the shift drum are rotatably and respectively held by the transmission cover via ball bearings held by bearing holding portions formed integrally with the transmission cover.

19. A vehicle power unit comprising:

a transmission having a single removable transmission cover, said single removable transmission cover including a bearing holding portion integrally formed within said transmission cover to support bearings secured within said bearing holding portion;

an engine having a crankcase;

an opening being formed on a wall of the crankcase said wall of the crankcase partially forming a storage member for storing the transmission, wherein power of the engine is transmitted to the transmission, said single removable transmission cover covering the opening formed on the wall of the crankcase;

a main shaft and a counter shaft of said transmission that is capable of being taken out and placed in through the opening, said main shaft and said counter shaft being secured on said storage member and rotatably supported by the single transmission cover for covering said opening;

a final drive output shaft being connected to said counter shaft, wherein said final drive output shaft, said main shaft and said counter shaft are rotatably held by said bearings within the bearing holding portion formed on said transmission cover;

an output gear being provided on said counter shaft;

an input gear being provided on said final drive output shaft, said output gear operatively engaging said input gear; and a multi-plate friction speed change clutch, wherein said clutch includes a clutch output shaft and said main shaft is spline-connected to the clutch output shaft, and wherein said clutch is mounted with a speed change gear group on a main side, the counter shaft mounted with a speed change gear group on a counter side and the output gear being engaged respectively with the speed change gear group on the main side, and is mounted with a speed change operation mechanism, said speed change operation mechanism including a shift drum;

an interlocking mechanism; and a plurality of shift forks operated by an operation of the speed change operation mechanism.

* * * * *